(12) United States Patent
Skowronek et al.

(10) Patent No.: US 9,850,875 B2
(45) Date of Patent: Dec. 26, 2017

(54) IGNITION SYSTEM AND METHOD FOR OPERATING AN IGNITION SYSTEM

(71) Applicant: Robert Bosch GmbH, Stuttgart (DE)

(72) Inventors: Tim Skowronek, Missen-Wilhams (DE); Thomas Pawlak, Immenstadt (DE); Wolfgang Sinz, Hergatz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/032,974

(22) PCT Filed: Oct. 22, 2014

(86) PCT No.: PCT/EP2014/072642
§ 371 (c)(1),
(2) Date: Jul. 28, 2016

(87) PCT Pub. No.: WO2015/071062
PCT Pub. Date: May 21, 2015

(65) Prior Publication Data
US 2016/0348633 A1    Dec. 1, 2016

(30) Foreign Application Priority Data

Nov. 14, 2013 (DE) .......................... 10 2013 223 187
Aug. 13, 2014 (DE) .......................... 10 2014 216 013

(51) Int. Cl.
*F02P 3/00* (2006.01)
*F02P 5/15* (2006.01)
(Continued)

(52) U.S. Cl.
CPC ............ *F02P 5/1516* (2013.01); *F02P 3/0407* (2013.01); *F02P 5/1502* (2013.01); *F02P 9/007* (2013.01);
(Continued)

(58) Field of Classification Search
CPC ...... F02P 5/1516; F02P 5/1502; F02P 3/0407; F02P 9/007; F02P 9/002; F02P 15/10; F02P 17/12; F02P 2017/121; Y02T 10/46
(Continued)

(56) References Cited

U.S. PATENT DOCUMENTS 4,639,676 A    1/1987  Kawai et al.
8,813,732 B2   8/2014  Kataoka et al.
(Continued)

FOREIGN PATENT DOCUMENTS

DE    102012106207 A    5/2013
EP    2 325 476 A1      5/2011
(Continued)

OTHER PUBLICATIONS

International Search Report dated Feb. 2, 2015 for International Application No. PCT/EP2014/072642.

*Primary Examiner* — Hai Huynh
(74) *Attorney, Agent, or Firm* — Norton Rose Fulbright US LLP; Gerard Messina (57) ABSTRACT

An ignition system and a method for operating an ignition system for an internal combustion engine are provided, including a primary voltage generator and a boost converter for generating an ignition spark. An ascertainment of a voltage requirement for the ignition spark is followed by a modification of a switch-on time of the boost converter relative to a switch-off time of the primary voltage generator.

16 Claims, 7 Drawing Sheets

(51) Int. Cl.
*F02P 3/04* (2006.01)
*F02P 17/12* (2006.01)
*F02P 9/00* (2006.01)
*F02P 15/10* (2006.01)

(52) U.S. Cl.
CPC .............. *F02P 17/12* (2013.01); *F02P 9/002* (2013.01); *F02P 15/10* (2013.01); *F02P 2017/121* (2013.01); *Y02T 10/46* (2013.01)

(58) Field of Classification Search
USPC ................................ 123/605, 623, 628, 644
See application file for complete search history.

(56) References Cited

U.S. PATENT DOCUMENTS

| | | | |
|---|---|---|---|
| 9,531,165 B2 * | 12/2016 | Ruan | F02P 3/053 |
| 2016/0281673 A1 * | 9/2016 | Skowronek | F02P 17/12 |

FOREIGN PATENT DOCUMENTS

| | | | |
|---|---|---|---|
| EP | 2325478 | B3 | 5/2011 |
| EP | 2639446 | A1 | 9/2013 |
| JP | H0868372 | A | 3/1996 |

* cited by examiner

IGNITION SYSTEM AND METHOD FOR OPERATING AN IGNITION SYSTEM

FIELD OF THE INVENTION

The present invention relates to a method for operating an ignition system for an internal combustion engine, including a first voltage generator ("primary voltage generator") and a boost converter. In addition, the present invention relates to a corresponding ignition system. The present invention relates, in particular, to an adjustment of the high voltage supply for generating an ignition spark with the aid of the boost converter.

BACKGROUND INFORMATION

Ignition systems are used in the related art for igniting an ignitable mixture in a combustion chamber of a spark-ignited internal combustion engine. For this purpose, an ignition spark gap is acted on with electrical energy or electrical voltage, in response to which the developing ignition spark ignites the combustible mixture in the combustion chamber. The main requirements of modern ignition systems are an indirect result of required emission and fuel reductions. Requirements of ignition systems are derived from corresponding engine-related approaches such as supercharging and lean operation and shift operation (spray-guided direct injection) in combination with increased exhaust gas recirculation rates (EGR). The representation of increased ignition voltage requirements and energy requirements in conjunction with increased temperature requirements is necessary. In conventional inductive ignition systems, the entire energy required for ignition must be temporarily stored in the ignition coil. The stringent requirements with respect to energy requirement result in a large ignition coil configuration. This conflicts with the reduced installation space conditions of modern engine concepts ("downsizing"). In an earlier application of the applicant, two main functions of the ignition system were assumed by different assembly units. A high voltage generator generates the high voltage required at the spark plug for the high voltage breakdown. A bypass, for example, in the form of a boost converter, provides energy for maintaining the ignition spark for continued mixture ignition. In this way, high spark energies may be provided during optimized spark current flow despite a reduced configuration of the ignition system.

Modern and future engine combustion processes profit from sharply increased ignition voltages. Supercharged engine configurations, in particular, are reliant on the provision of increased ignition voltage supplies. However, current ignition systems place strict limitations on the form of the ignition voltage supply, since one and the same primary voltage generator is used for providing the high voltage required for ignition and also for storing the energy required for the continued maintenance of the ignition process. If the required ignition voltage curves were provided by conventional primary voltage generators alone, this would also result in a configuration which would conflict with the trend for reducing the size of the units ("downsizing").

SUMMARY OF THE INVENTION

Thus, it is an object of the present invention to resolve the aforementioned conflict of objective.

The aforementioned need is satisfied according to the present invention by an ignition system and a method for operating an ignition system. Both are distinguished by the fact that a main contribution for the provision of an ignition spark voltage is provided by a first voltage generator ("primary voltage generator"), for example, in the form of an ignition transformer, which is superposed by a boost converter as a function of a high voltage requirement at the spark plug. According to the present invention, the boost converter may generate a voltage already prior to ignition (during switch-off of the primary voltage generator), which is superposed on the output voltage of the primary voltage generator. The method according to the present invention for operating an ignition system is particularly suited for a gasoline-operated internal combustion engine, since it is possible, for example, to react to operation-related deposits on the spark plugs, which represent an electrical shunt and thus reduce the voltage supply provided by the ignition system. In addition, a particularly suitable use is possible in supercharged combustion processes (turbocharging), since the high boost pressures make a high ignition voltage necessary. The ignition system includes a primary voltage generator and a boost converter, the boost converter being primarily configured to maintain a spark generated with the aid of the primary voltage generator. Moreover, energy of the vehicle electrical system may be brought via the boost converter to a suitable voltage level and fed to the spark gap. This voltage is therefore superposed during the voltage buildup of the ignition transformer and thus initiates the spark breakdown at the spark gap. The method according to the present invention is distinguished by an ascertainment of a voltage requirement for an ignition spark to be generated with the aid of the boost converter and with the aid of the primary voltage generator. In other words, the voltage supply for generating the ignition spark may vary as a function of an instantaneous operating state. In response thereto, the switch-on time of the boost converter is modified in order to dose the voltage supply according to need. In this way, a sufficient supply of electrical energy at the point in time of ignition may still occur with a smaller primary voltage generator. For example, the energy available at the ignition spark gap may be adjusted according to the present invention based alone on the variation of the operating states of the primary voltage generator on the one hand and the boost converter on the other hand. This has the advantage that the electrical components of both the aforementioned components end up smaller and insulation costs may end up lower, which enables a more cost-effective production.

Thus, the installation space of the ignition transformer, in particular, may be reduced.

The operation of the boost converter therefore provides the advantage of a higher voltage supply, with which the primary voltage generator (for example, the ignition transformer) is boosted. In this way, the primary voltage generator itself may on the one hand be smaller dimensioned given the same voltage supply or, given the same dimensioning, may share in a higher voltage supply of the ignition system on the other hand. Moreover, with the use of the boost converter operation according to the present invention, the shunt resistance of the ignition system is also increased due to the higher internal resistance of the boost converter.

The subclaims show refinements of the present invention.

The ascertainment of the voltage requirement may include a measurement of an output voltage present across the spark gap or of a corresponding measuring voltage. This may take place, for example, through a shunt. The voltage may be ascertained, for example, with the aid of an electronic circuit, with the aid of an analog electrical circuit, with the aid of a field programmable gate array (FPGA) or with the aid of an ASIC within the ignition system. In this way, a smaller or no additional hardware outlay is required for implementing the method according to the present invention.

The ascertainment of the voltage requirement also may include a comparison of a measured electrical parameter of an output voltage present across the spark gap or of a corresponding measuring voltage or of a signal received by an electronic control unit, with an assigned reference. In other words, either an actually existing electrical variable may be ascertained or an expected parameter for an ascertained operating state may be assumed, without ascertaining once again the parameter itself. The latter approach is frequently referred to as "parameterizing" the parameter. This reference may, for example, be retrieved from a memory medium. This reference characterizes threshold values, for example, during the exceedance of which the ignition voltage should be lowered and during the shortfall of which the ignition voltage should be increased. For example, a voltage requirement may be ascertained in a first ignition cycle and the switch-on time of the boost converter may be modified in a subsequent, in particular, immediately subsequent ignition cycle. For example, threshold values in the form of ignition voltage requirements may be stored as electrical parameters and compared with ascertained parameters. The electronic control unit used may, for example, be an engine control unit or an ignition control unit, the evaluation electronics of which ascertain and provide signals for controlling the operation of the internal combustion engine. The comparison of measured values or control signals with individual references or threshold values represents a simple mathematical operation, which, in terms of circuitry, may be implemented in a cost-effective and space-saving manner.

The method further may include classifying the electrical parameter by assigning a measuring value for the electrical parameter to a predefined parameter interval, for example, within a memory medium of the ignition system. In this case, the ignition system may be configured to assign suitable switch-on times for the boost converter to respective parameter classes. The switch-on times may be assigned, for example, within a memory medium of the ignition system of the respective parameter class and, in response to a classification, may be used when determining the switch-on time of the boost converter. This operation is also a low-cost and, in terms of circuitry, simple and rapidly achievable option for implementing the present invention.

The parameter may be further ascertained within an electronic circuit, within an analog circuit, within a microcontroller, within a field programmable gate array (FPGA) and/or of an ASIC of the ignition system. Thus, the aforementioned electronic components are situated in the area of any ignition system for controlling the ignition process. Therefore, an implementation of the present invention is possible in this way without additional hardware outlays.

The switch-on time may be further modified in response to a reduced voltage requirement of the ignition system for a successful ignition. If the switch-on time of the boost converter is delayed as compared to a point in time of a switch-off of the primary voltage generator, the current output and/or the voltage output and/or the power output of the boost converter is reduced at the switch-off time of the primary voltage generator, which results in a reduction of the corresponding electrical variable at the spark gap. In the reversed case, an advanced switching on of the boost converter in response to an increased voltage requirement relative to the point in time of a switch-off of the primary voltage generator results in an increase in the voltage output of the boost converter. In this way, the ignition voltage supply provided may be suitable adjusted.

It is advantageous if the voltage requirement is ascertained by ascertaining a predetermined operating state of an internal combustion engine, the predetermined operating state being assigned a predetermined switch-on time or, alternatively, a predetermined voltage requirement. The first alternative has the advantage that the switch-on time is derived directly from the operating state and that as a result, the complexity within the ignition system is reduced, since the control is provided in an external control unit, for example, an engine control unit. The second alternative has the advantage that the switch-on time is set with the aid of a controller, and thus the voltage requirement is optimally adjustable, this controller being provided in an internal electronic module of the ignition system.

The ignition system with which the method according to the present invention is carried out includes a boost converter for increasing a high voltage supply for a high voltage to be generated with the aid of a primary voltage generator. The ignition system is characterized by an arrangement for ascertaining a voltage requirement for the voltage supply to be generated with the aid of the ignition system. In other words, the arrangement may ascertain a change of operating state of the ignition system or of the internal combustion engine, in response to which the spark plug is to be provided with a modified voltage supply in order to reliably generate a sparkover. In addition, the ignition system according to the present invention includes an arrangement for modifying a switch-on time of the boost converter in response to an ascertained voltage requirement change. These arrangements are configured to adjust the switch-on time of the boost converter, for example, relative to the crank angle of the internal combustion engine or the switch-off time of the primary voltage generator in accordance with the voltage requirement, in order to feed a high voltage to the spark gap according to need for generating the ignition sparkover. The features, feature combinations and the advantages resulting therefrom correspond essentially to those explained in connection with the first named inventive aspect, so that to avoid repetitions, reference is made to the foregoing explanations.

The ignition system may include a shunt, with the aid of which it is configured to carry out a voltage measurement, in order to ascertain a voltage requirement. The measurement may be carried out in a first ignition cycle and the modification of the switch-on time may be carried out with respect to a subsequent ignition cycle. The voltage measurement via the shunt may take place, for example, via an electronic circuit, an analog circuit, a microcontroller, an FPGA and/or an ASIC of the ignition system. The electrical parameters to be ascertained are voltages. Since modern ignition systems include the aforementioned components individually or in combination on any combustion chamber or on any spark plug, the implementation of the ignition system according to the present invention may be achieved with minimal or entirely without additional hardware outlays.

The ignition system also may include a memory arrangement, with the aid of which it is configured to classify the instantaneous voltage requirement for generating an ignition spark. In other words, the voltage requirement measured in the instantaneous operating state may be compared with voltage requirement classes within the memory arrangement. The memory arrangement may also store predefined switch-on times for the boost converter, which have proven suitable for the respective voltage requirement classes. In this way, a simple and in terms of circuitry, cost-effective implementation of an ignition system according to the present invention is possible.

Exemplary embodiments of the present invention are described in detail below with reference to the accompanying drawings.

DETAILED DESCRIPTION

Figure 1:
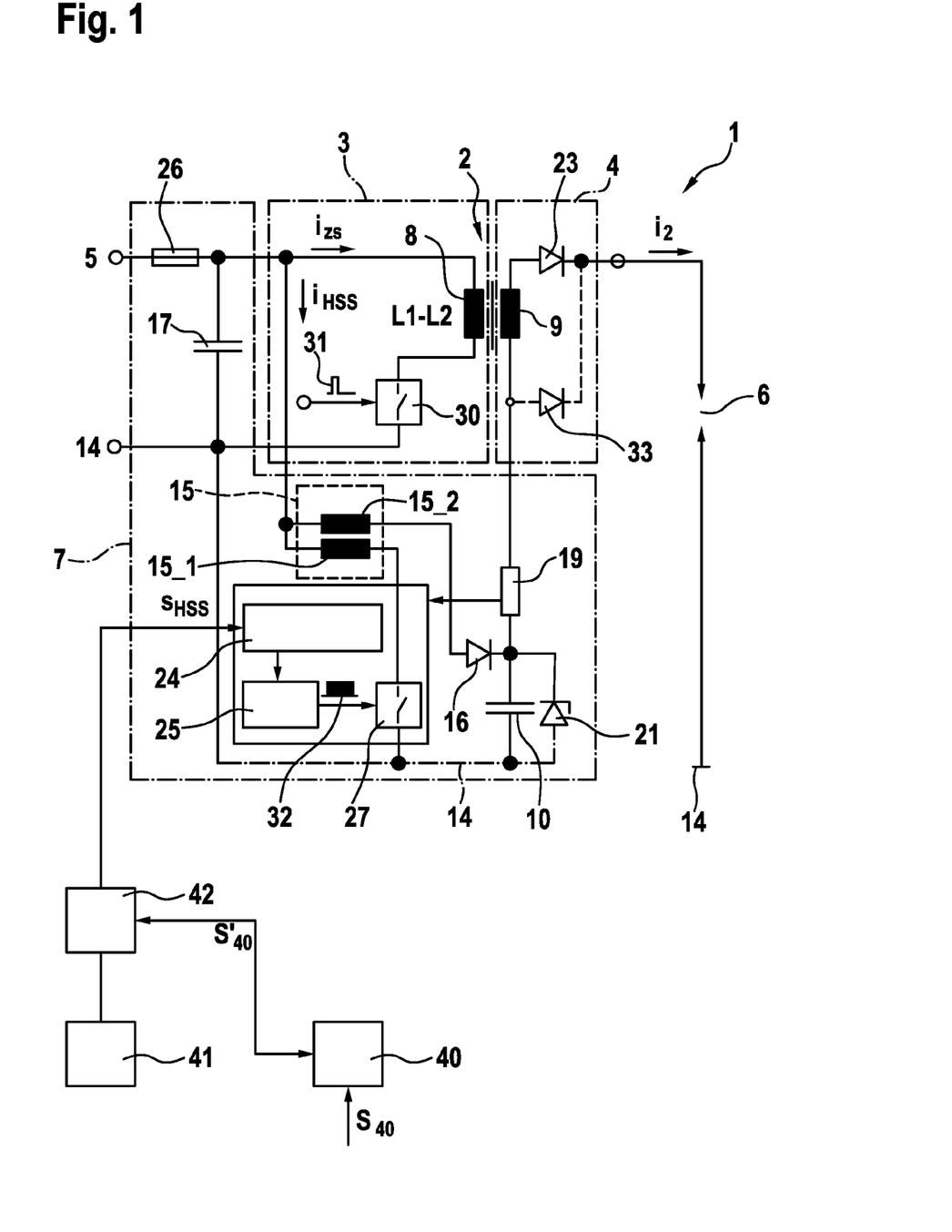
FIG. 1 shows a circuit diagram of one exemplary embodiment of an ignition system according to the present invention.

FIG. 1 shows a circuit of an ignition system 1, which includes a step-up transformer 2 as a high voltage generator, the primary side 3 of which may be supplied with electrical energy from an electrical energy source 5 via a first switch 30. Step-up transformer 2, made up of a primary coil 8 and a secondary coil 9, may also be referred to as a first voltage generator or primary voltage generator. A fuse 26 is provided at the input of the circuit, in other words, therefore, at the terminal to electrical energy source 5. In addition, a capacitance 17 for stabilizing the input voltage is provided in parallel to the input of the circuit or in parallel to electrical energy source 5. Secondary side 4 of step-up transformer 2 is supplied with electrical energy via an inductive coupling of primary coil 8 and secondary coil 9, and includes a diode 23 known from the related art for suppressing the powering spark, this diode being alternatively substitutable with diode 21. A spark gap 6, via which ignition current $i_2$ is intended to ignite the combustible gas mixture, is provided in a loop with secondary coil 9 and diode 23 against an electrical ground 14. A boost converter 7 is provided between electrical energy source 5 and secondary side 4 of step-up transformer 2 and includes an inductance 15, a switch 27, a capacitance 10 and a diode 16. In boost converter 7, inductance 15 is provided in the form of a transformer having a primary side 15_1 and a secondary side 15_2. Inductance 15 in this case serves as an energy store for maintaining a current flow. Two first terminals of primary side 15_1 and secondary side 15_2 of the transformer are each connected to electrical energy source 5 and fuse 26. In this configuration, a second terminal of primary side 15_1 is connected via switch 27 to electrical ground 14. A second terminal of secondary side 15_2 of the transformer is connected without a switch directly to diode 16 which, in turn, is connected via a node to a terminal of capacitance 10. This terminal of capacitance 10 is connected, for example, via a shunt 19 to secondary coil 9 and another terminal of capacitance 10 is connected to electrical ground 14. The power output of the boost converter is fed via the node at diode 16 into the ignition system and provided to spark gap 6.

Diode 16 is oriented conductively in the direction of capacitance 10. Due to the transfer ratio, a switching operation by switch 27 in the branch of primary side 15_1 also acts on secondary side 15_2. However, since current and voltage according to the transformation ratio are higher or lower on the one side than on the other side of the transformer, more favorable dimensionings for switch 27 for switching operations may be found. For example, lower switching voltages may be implemented, as a result of which the dimensioning of switch 27 is potentially simpler and more cost-effective. Switch 27 is controlled via a control 24, which is connected via a driver 25 to switch 27. Shunt 19 is provided as a current measuring arrangement or voltage measuring arrangement between capacitance 10 and secondary coil 9, the measuring signal of which is fed to switch 27. In this way, switch 27 is configured to react to a defined range of current intensity $i_2$ through secondary coil 9. A Zener diode 21 is connected in the reverse direction in parallel to capacitance 10 for securing capacitance 10. Furthermore, control 24 receives a control signal $S_{HSS}$. Via this signal, the feed of energy or power output via boost converter 7 into the secondary side may be switched on and off. In the process, the output of the electrical variable introduced by the boost converter and into the spark gap, in particular via the frequency and/or pulse-pause ratio, may also be controlled via a suitable control signal $S_{HSS}$. According to the present invention, a switching point in time may be shifted via control signal $S_{HSS}$ when the energy requirement of the ignition spark gap changes. A switching signal 32 is also indicated, with the aid of which switch 27 may be activated via driver 25. When switch 27 is closed, inductance 15 is supplied with a current via electrical energy source 5, which flows directly to electrical ground 14 when switch 27 is closed. When switch 27 is open, the current is directed through inductance 15 via diode 16 to capacitor 10. The voltage occurring in response to the current in capacitor 10 is added to the voltage dropping across second coil 9 of step-up transformer 2, thereby supporting the electric arc at spark gap 6. In the process, however, capacitor 10 is discharged, so that by closing switch 27, energy may be brought into the magnetic field of inductance 15, in order to charge capacitor 10 with this energy again when switch 27 is re-opened. It is apparent that control 31 of switch 30 provided in primary side 3 is kept significantly shorter than is the case with switching signal 32 for switch 27. Optionally, a non-linear two-terminal circuit, symbolized in the following by a high voltage diode 33, depicted with dashed lines, of coil 9 of boost converter 7 on the secondary side, may be connected in parallel. This high voltage diode 33 bridges high voltage generator 2 on the secondary side, as a result of which the energy delivered by boost converter 7 is guided directly to spark gap 6, without being guided through secondary coil 9 of high voltage generator 2. No losses across secondary coil 9 occur as a result and the degree of efficiency is increased.

In FIG. 1, an output terminal, at which the output voltage of the ignition system and the output voltage present across the spark gap is measurable, is delineated between spark gap 6 and the additional node. The output voltage present at the output terminal corresponds to the voltage supply of the ignition system.

An ascertainment according to the present invention of a modified energy requirement for the spark gap is possible through an information technology linking of engine control unit 40, which receives a first signal $S_{40}$ for setting an operating point of an internal combustion engine and outputs a corresponding second signal $S_{40}'$ to a microcontroller 42. Microcontroller 42 is further connected to a memory 41, from which references in the form of limiting values for classes of voltage supplies for the instantaneous or future required electrical voltage for generating the ignition spark may be read. Microcontroller 42 is configured to influence the switch-on time of boost converter 7, to supply control 24 with a control signal $S_{HSS}$ modified or time-delayed according to need, in response to which driver 25 supplies switch 27 with a modified or delayed switching signal 32. For example, boost converter 7 may be switched on sooner or later in response to the receipt of changed switching signal 32, so that the electrical voltage across capacitance 10 is lower or higher at the switch-off time of switch 30, so that the generation of the ignition spark may be carried out in a safer or more wear-resistant manner.

Figure 2:
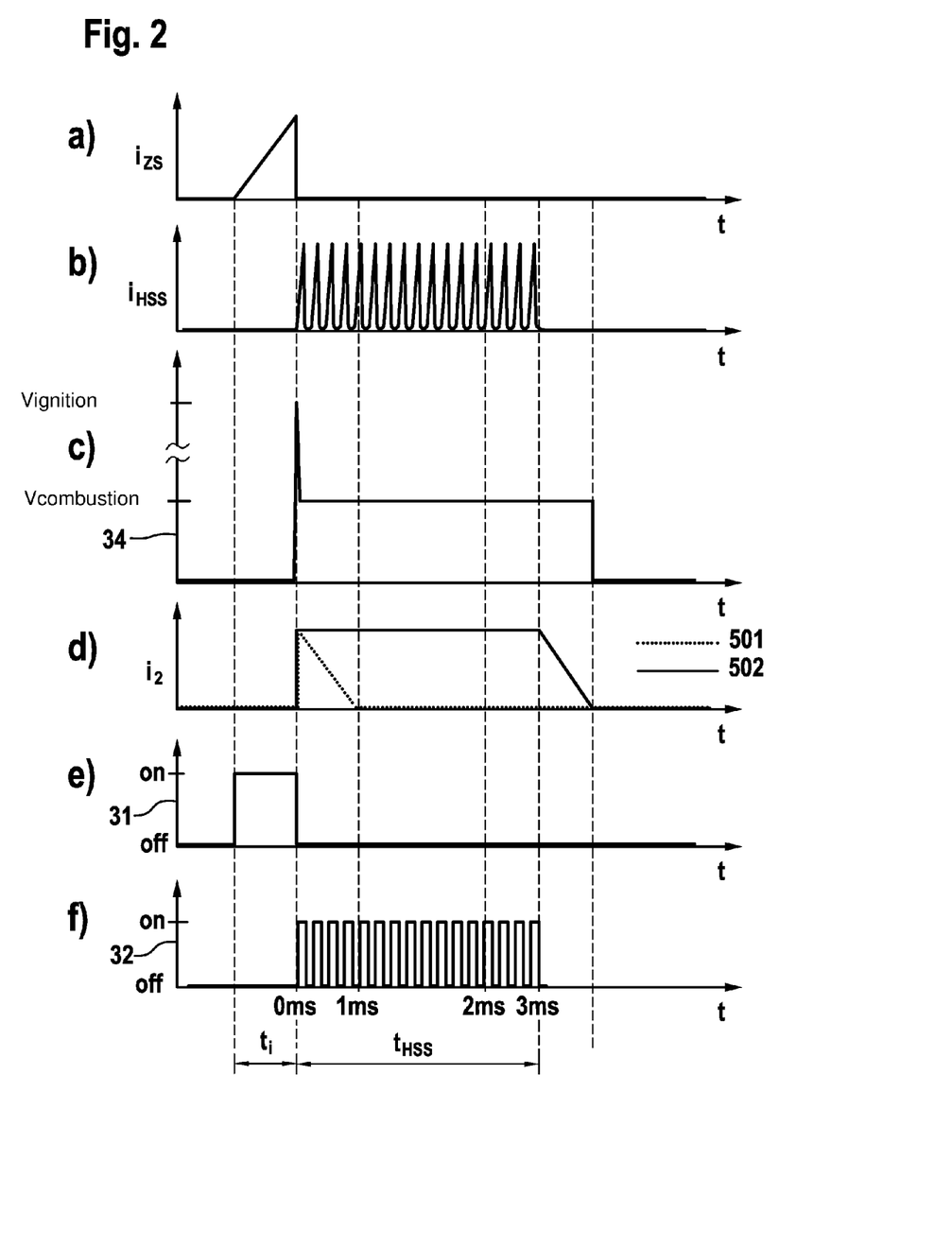
FIG. 2 shows time diagrams for electrical parameters as they may occur during the operation of the ignition system depicted in FIG. 1.

FIG. 2 shows time diagrams for a) ignition coil current $i_{zs}$, b), associated boost converter current $i_{HSS}$, c), the voltage on the output side across spark gap 6, d) secondary coil current $i_2$ for the ignition system depicted in FIG. 1 without (501) and with (502) the use of boost converter 7 according to the present invention, e) switching signal 31 of switch 30 and f) switching signal 32 of switch 27. In particular: Diagram a) shows a short and steep rise in primary coil current $i_{zs}$, which occurs during the time in which switch 30 is in the conductive state ("ON," see diagram 3e). With switch 30 switched off, primary coil current $i_{zs}$ also drops to 0 A. Diagram b) illustrates in addition the current consumption of boost converter 7 according to the present invention, which arises as a result of pulsed activation of switch 27. In practice, clock rates in the range of several 10 kHz have proven to be a reliable switching frequency, in order to achieve corresponding voltages on the one hand and acceptable degrees of efficiency on the other hand. The integral multiples of 10,000 Hz in the range of between 10 kHz and 100 kHz are cited by way of example as possible range limits. To regulate the output delivered to the spark gap during an existing ignition spark, a, in particular, stepless control of the pulse-pause ratio of signal 32 is recommended for generating a corresponding output signal. Diagram c) shows profile 34 of the voltage occurring at spark gap 6 during the operation according to the present invention. Diagram d) shows the profiles of secondary coil current $i_2$. Once primary coil current $i_{zs}$ results in 0 A due to an opening of switch 30, and the magnetic energy stored in the step-up transformer is discharged as a result in the form of an electrical arc across spark gap 6, a secondary coil current $i_2$ occurs, which rapidly drops toward 0 without boost converter (501). In contrast to this, an essentially constant secondary coil current $i_2$ (502) is driven across spark gap 6 by a pulsed activation (see diagram f, switching signal 32) of switch 27, secondary current $i_2$ being a function of the burning voltage at spark gap 6 and, for the sake of simplicity, a constant burning voltage being assumed here. Only after interruption of boost converter 7 by opening switch 27, does secondary coil current $i_2$ then also drop toward 0 A. It is apparent from diagram d) that the descending flank is delayed by the use of boost converter 7. The entire period of time during which the boost converter is used, is characterized as $t_{HSS}$ and the period of time during which energy is passed into step-up transformer 2 on the primary side, as $t_i$. The starting time of $t_{HSS}$ as opposed to $t_i$ may be variably selected. In addition, it is also possible to increase the voltage supplied by the electrical energy source via an additional DC-DC converter (not depicted), before this voltage is further processed in boost converter 7 according to the present invention. It is noted that specific configurations are a function of many external boundary conditions inherent to circuitry. The involved person skilled in the art is not presented with any unreasonable difficulties in undertaking the dimensionings suitable for this purpose and for the boundary conditions that must be taken into consideration.

FIGS. 3a through 3d show time diagrams of electrical variables, as they may occur during the operation of the ignition system shown in FIG. 1, an ohmic-capacitive load rather than a spark gap 6 being used on the output side. Thus, a flashover does not result. For the following signal curves, the maximum value of the output voltage, in particular, the high voltage supply, is crucial.

Figure 3A:
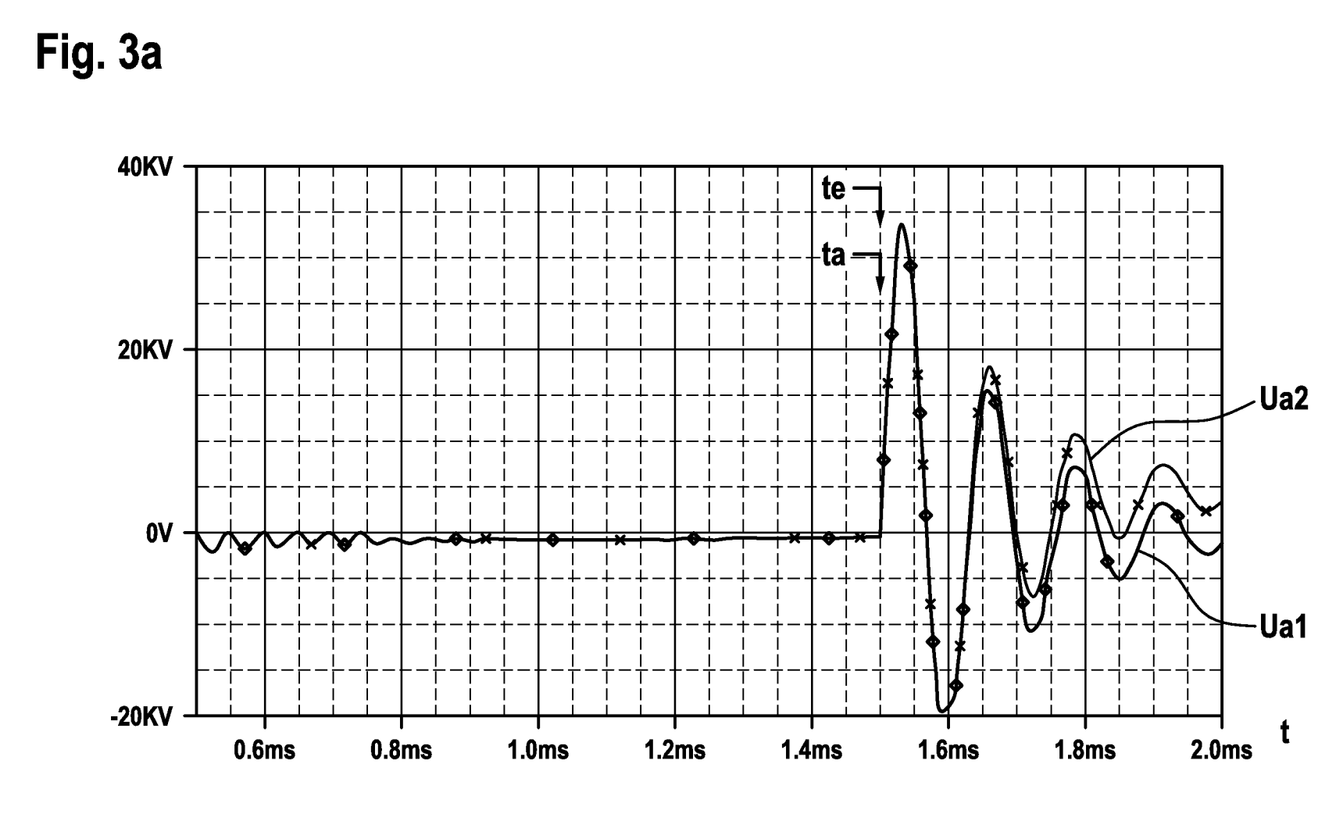
FIGS. 3a and 3b show time diagrams for electrical parameters as they may occur during the operation according to the present invention of the ignition system depicted in FIG. 1.

FIG. 3a shows a time diagram of electrical variables as they may occur during the operation of the ignition system shown in FIG. 1. In the time diagram depicted, switch-off time $t_a$ of the primary voltage generator and switch-on time $t_e$ of the boost converter occur simultaneously. In other words, the boost converter is switched on when the current flow on the primary side is interrupted by the primary voltage generator. The output voltage $U_{a2}$ of the ignition system according to the present invention results, which is compared to the output voltage $U_{a1}$ during operation without the boost converter. The maximum voltage $U_{a2}$ corresponds approximately to $U_{a1}$.

Figure 3B:
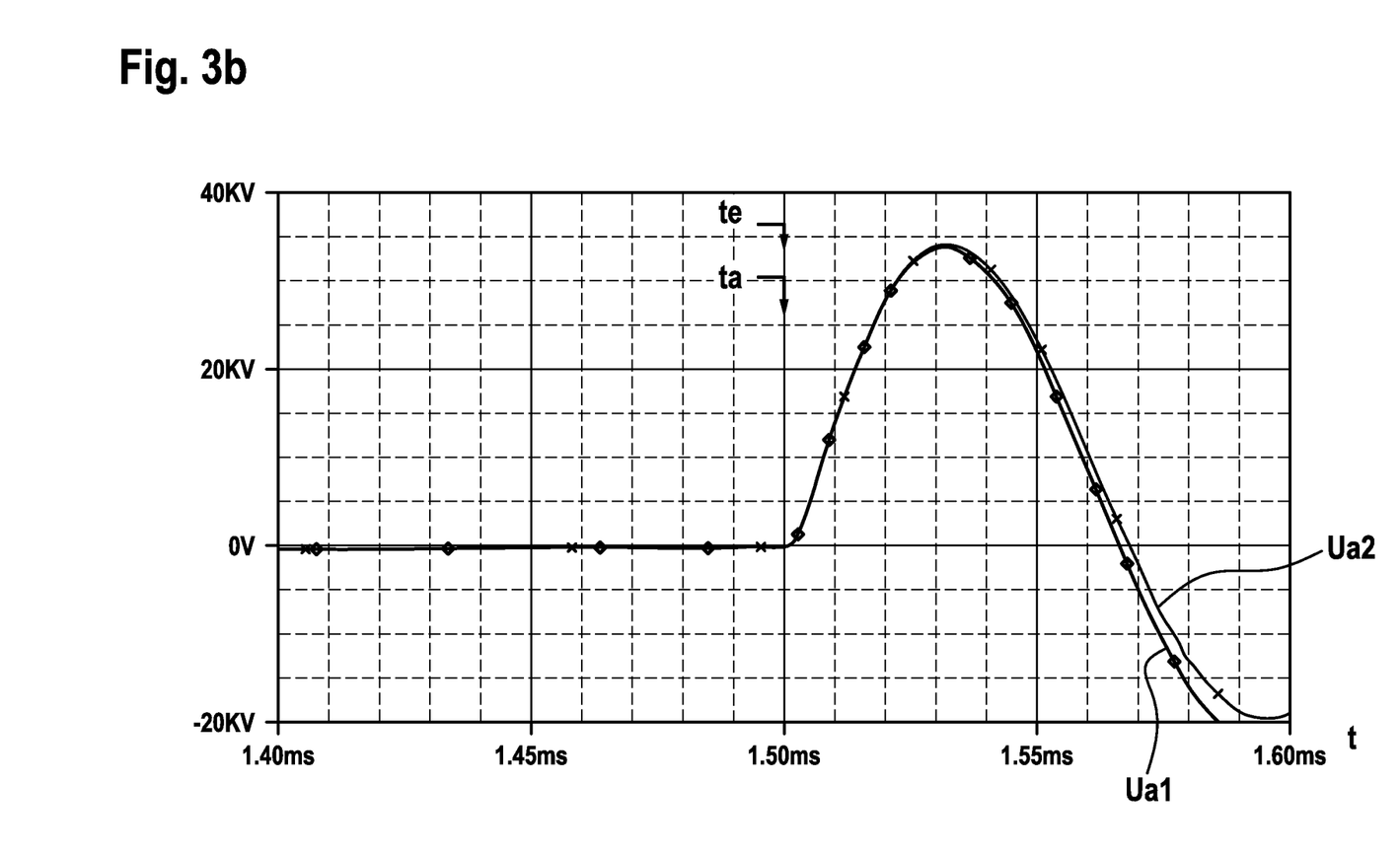

FIG. 3b shows a time diagram of electrical variables as they may occur during the operation of the ignition system shown in FIG. 1. FIG. 3b shows a chronological section of the signal curve of output voltage $U_{a2}$ shown in FIG. 3a after the switch-off time $t_a$ of the current on the primary side by the primary voltage generator.

Figure 3C:
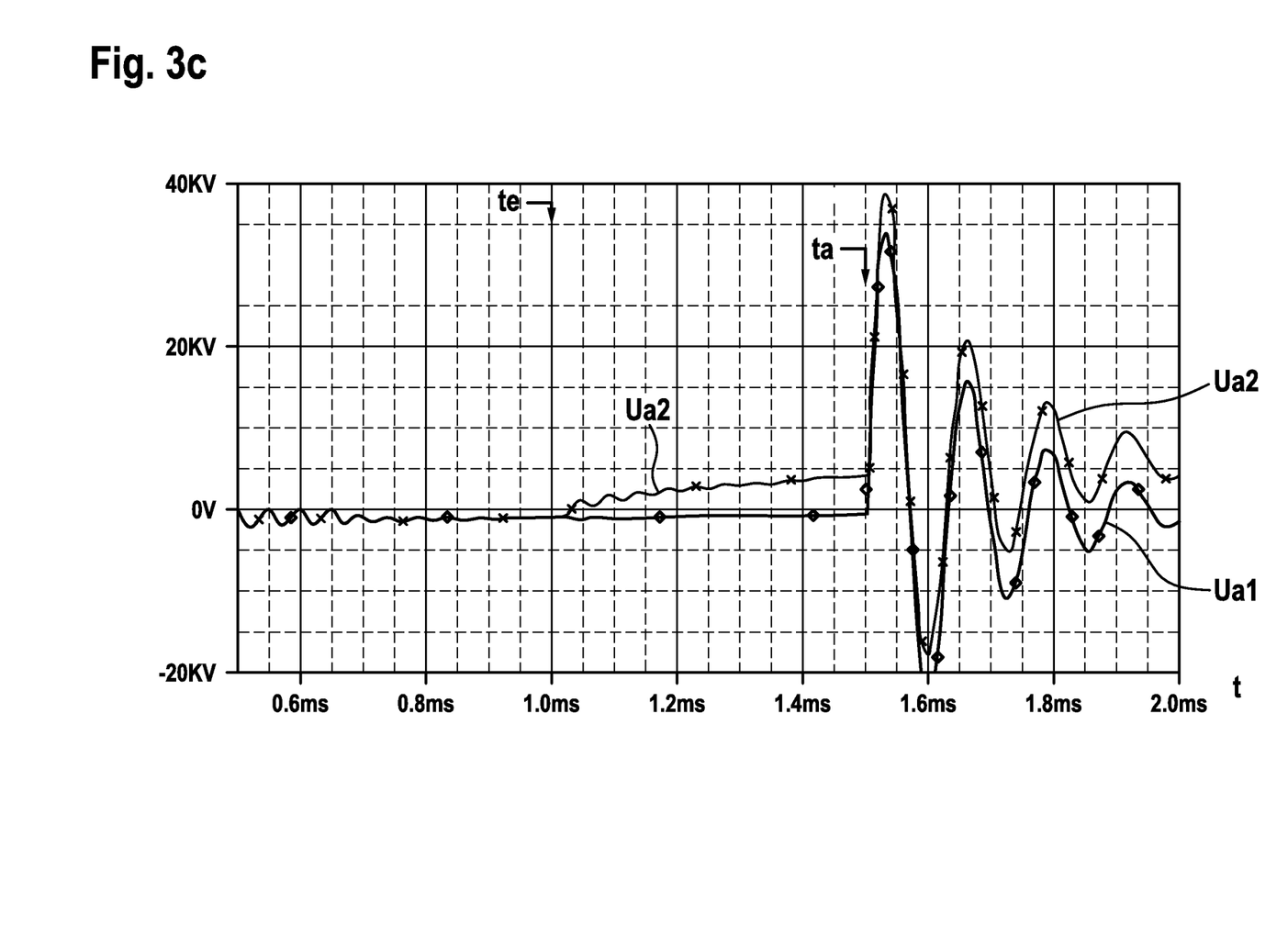
FIGS. 3c and 3d show time diagrams for electrical parameters as they may occur during the operation of the ignition system depicted in FIG. 1.

FIG. 3c shows a time diagram of electrical variables as they may occur during the operation of the ignition system shown in FIG. 1. Compared to FIGS. 3a and 3b, the switch-on time $t_e$ of the boost converter in FIG. 3c was advanced as compared to the switch-off time $t_a$ of the current on the primary side by the primary voltage generator. Accordingly, output voltage $U_{a2}$ between points in time 1.0 ms through 1.5 ms increases already prior to switch-off time $t_a$, so that already at switch-off time $t_a$ output voltage $U_{a2}$ has increased as compared to the curve of output voltage $U_{a1}$ without boost converter operation. In other words, an increased output voltage is already available at switch-off time $t_a$. This also applies to the further time curve of output voltage $U_{a2}$, as is apparent by a comparison with FIG. 3a.

Figure 3D:
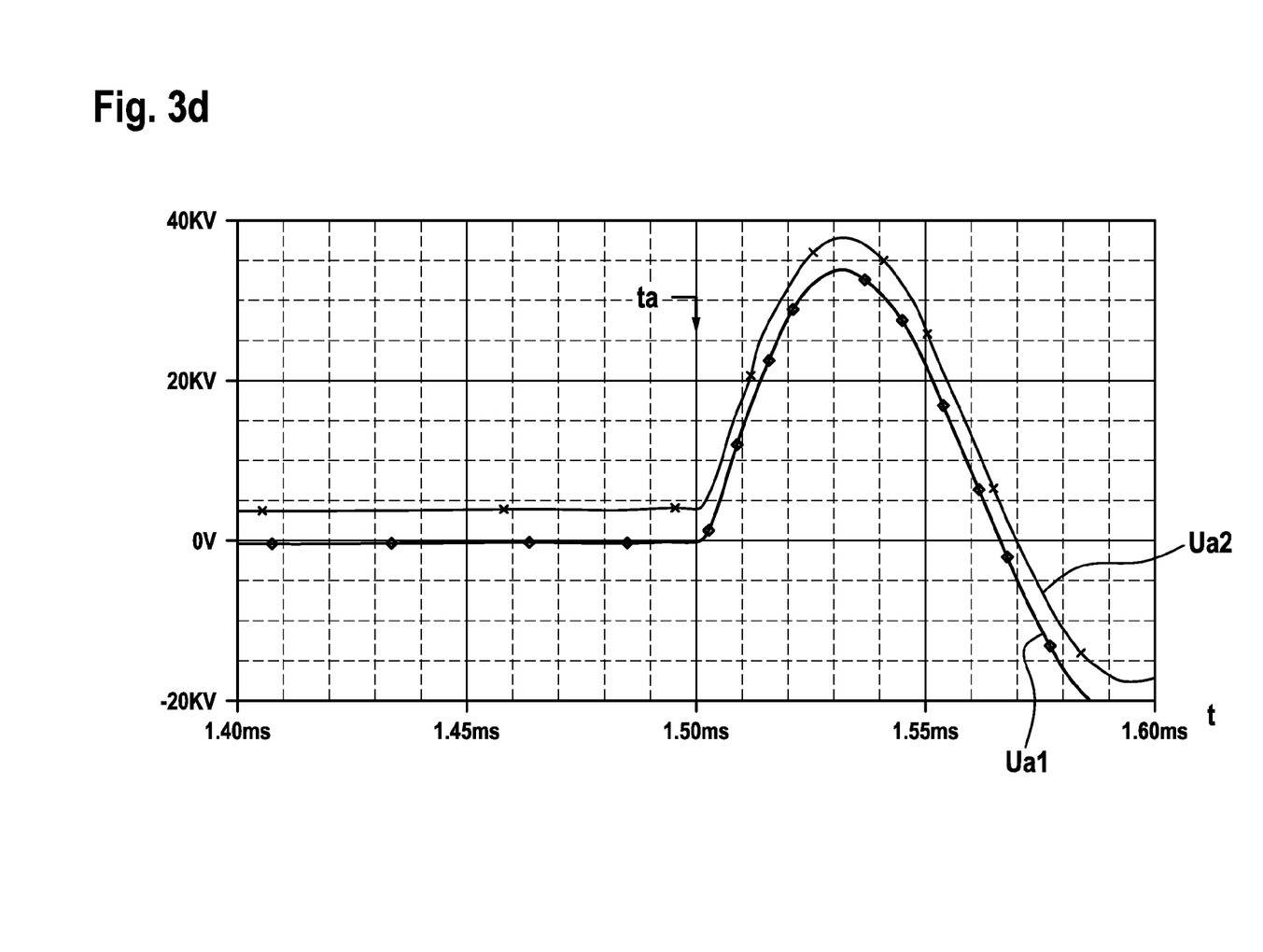

FIG. 3d shows a time diagram of electrical variables as they may occur during the operation of the ignition system shown in FIG. 1. In this case, FIG. 3d shows a section of the time domain depicted in FIG. 3c. From this depiction, it becomes even clearer how the advanced switch-on time $t_e$ of the boost converter effects the voltage supply at switch-off time $t_e$ of the current of the primary voltage generator on the primary side. Thus, the high voltage supply of the ignition system increases as a result of this operating mode.

Figure 4:
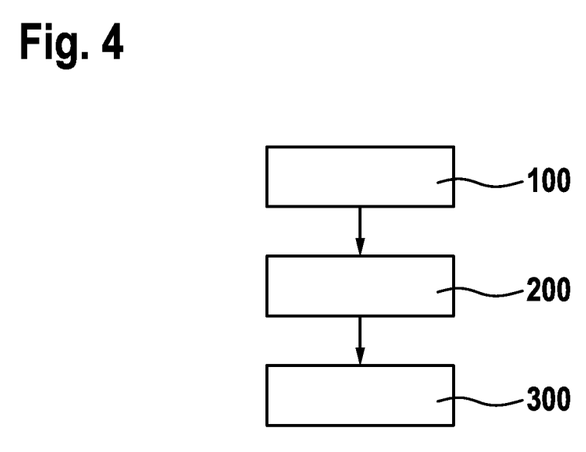
FIG. 4 shows a flow chart illustrating steps of an exemplary embodiment of a method according to the present invention.

FIG. 4 shows a flow chart, illustrating the steps of an exemplary embodiment of a method according to the present invention. In this embodiment, a voltage requirement for an ignition spark to be generated by the ignition system with the aid of the boost converter and the primary voltage generator is ascertained in step 100. During the course thereof, a measurement of an electrical operating variable of the ignition system during a first ignition cycle is carried out, and the ascertained value is compared with a stored reference in step 200. An operating parameter associated with the reference, which, for example may be stored as an operating variable class assigned to the measured values, is read out and in step 300, the switch-on time of the boost converter is modified accordingly with respect to a second ignition cycle. For example, the switch-on time may be sooner or later and may be defined relative to a crank shaft angle of the internal combustion engine or relative to the switch-off time of the primary voltage generator. As a result of the modified switch-on time, a high voltage adjusted by the boost converter is delivered to the spark gap, so that a voltage supply, which accordingly is greater than the ignition voltage requirement of the spark gap, ensures a reliable sparkover at the spark gap.

In step 100, the voltage requirement of the ignition system may be ascertained by ascertaining the instantaneous operating state of the internal combustion engine, a predetermined switch-on time or a predetermined voltage requirement being assigned to the predetermined operating state. The operating state is defined, for example, by one or multiple operating parameters of the internal combustion engine, for example, the type of mixture formation, instantaneous combustion process, charging state, torque, power output, speed, exhaust gas recirculation configuration or exhaust gas recirculation parameter. Alternatively, the voltage requirement may be ascertained in step 100 by measuring an output voltage present across the spark gap or a corresponding voltage, the maximum value of the output voltage measured in the predetermined time period corresponding to the voltage requirement. The predetermined time period is, in particular, the time period prior to a flashover of the ignition spark. A voltage corresponding to the output voltage may be measured, for example, on primary side 3 of step-up transformer 2 or at shunt 19.

In step 200, a voltage supply for the ignition spark to be ascertained is compared with the ascertained voltage requirement. In this step, it is ascertained whether an exceedance condition is met by checking whether the amount of the voltage supply exceeds the amount of the voltage requirement at least by a predetermined voltage difference. When comparing the ascertained voltage supply with the ascertained voltage requirement in step 200, it is ascertained whether an exceedance condition is met by checking whether the ascertained voltage supply exceeds the ascertained voltage requirement at least by a predetermined voltage difference. The predetermined voltage difference is, for example, in the range between 2 kV and 10 kV, in particular at 5 kV.

If the exceedance condition is met, the switch-on time $t_e$ is modified in step 300 at a later point in time relative to the switch-off time $t_a$ of primary voltage generator 2. If, on the other hand, the exceedance condition is not met, the switch-on time $t_e$ is modified in step 300 at an earlier point in time relative to the switch-off time $t_a$ of primary voltage generator 2, in order to reliably generate a sparkover.

In step 300, the switch-on time of boost converter 7 is modified at an earlier or later point in time relative to switch-off time $t_a$ of primary voltage generator 2, i.e., as a function of the ascertained voltage requirement and/or as a function of the ascertained voltage supply. In operating states with a high voltage requirement, switch-on time $t_e$ is modified at an earlier point in time relative to switch-off time $t_a$ of primary voltage generator 2.

The modification of the switch-on time $t_e$ in this case is carried out in predetermined stages. The switch-on time of boost converter 7 is determined in each case by the point in time at which switch 27 of boost converter 7 begins to cyclically switch.

The voltage supply may be ascertained by measuring an output voltage present across the spark gap or a corresponding voltage. In the process, the gradient of the measured output voltage as seen across the time curve may be evaluated, in particular, at the point in time of ignition. The voltage supply may be quantitatively derived from the measured output voltage and/or from the gradient of the output voltage. When evaluating the gradient of the measured output voltage across the time curve, it may, for example, be checked whether the absolute value of the gradient of the measured output voltage falls below a predetermined minimum value.

Alternatively, the voltage supply may be ascertained by determining suitable influence variables of the ignition system, for example, by ascertaining the temperature of a primary winding of the primary voltage generator and/or the primary current flowing through the primary winding. The voltage supply may be determined with the aid of the influence variables, for example, via a model, a look-up table or via formulas or algorithms. The temperature of the primary winding may be directly measured by a temperature sensor, for example, on the primary winding, or determined indirectly, for example, from a cooling water temperature of an internal combustion engine.

A computer program may be provided, which is configured to carry out all described steps of the method according to the present invention. The computer program in this case is stored on a memory medium. As an alternative to the computer program, the method according to the present invention may be controlled by an electrical circuit provided in the ignition system, an analog circuit, an ASIC or a microcontroller, which is configured to carry out all described steps of the method according to the present invention.

Even though the aspects and advantageous specific embodiments according to the present invention have been described in detail with reference to exemplary embodiments explained in conjunction with the appended drawing figures, modifications and combinations of features of the depicted exemplary embodiments are possible for those skilled in the art, without departing from the scope of the present invention, the scope of protection of which is defined by the appended claims.

What is claimed is:

1. A method for adjusting a high voltage supply for an ignition spark in an ignition system to be generated with a primary voltage generator, the ignition system including the primary voltage generator and a boost converter, for an internal combustion engine, the method comprising:
   ascertaining a voltage requirement for an ignition sparkover to be generated; and
   modifying, in response to the voltage requirement, a switch-on time of the boost converter relative to a switch-off time of the primary voltage generator;
   wherein at least one of: (i) the modifying includes, in response to a reduced voltage requirement, modifying the switch-on time of the boost converter such that the boost converter is switched on at a later point in time relative to the switch-off time of the primary voltage generator, the switch-on time of the boost converter being prior to the switch-off time of the primary voltage generator, and (ii) the modifying includes, in response to an increased voltage requirement, modifying the switch-on time of the boost converter such that the boost converter is switched on at an earlier point in time relative to the switch-off time of the primary voltage regulator, the switch-on time of the boost converter being prior to the switch-off time of the primary voltage generator.

2. The method of claim 1, wherein the ascertaining of the voltage requirement includes performing at least one of: (i) measuring an output voltage present across the spark gap or a corresponding measured voltage, and (ii) receiving a signal from an electronic control unit.

3. The method of claim 1, wherein the ascertaining of the voltage requirement includes comparing a measured electrical parameter, in particular, an output voltage present across the spark gap or a measuring voltage or a signal received by an electronic control unit, with an assigned reference.

4. The method of claim 3, further comprising:
classifying the result of the comparing; and
modifying a switch-on time of the boost converter as a function of a parameter assigned to the class.

5. The method of claim 1, wherein the modifying of the switch-on time occurs with respect to a crankshaft angle of an internal combustion engine provided with the ignition system or with respect to a switch-off time of the primary voltage generator.

6. The method of claim 1, wherein the ascertaining of a voltage requirement occurs during a first ignition process, and the modifying of the switch-on time occurs during a second, subsequent ignition process.

7. The method of claim 1, wherein the ascertaining of the voltage requirement includes one of the following:
ascertaining a predetermined operating state of an internal combustion engine, a predetermined voltage requirement or a predetermined switch-on time being assigned to the predetermined operating state; and
measuring an output voltage present across the spark gap or a corresponding voltage, a maximum value of the output voltage measured in a predetermined time period corresponding to the voltage requirement.

8. The method of claim 1, wherein the modifying of a switch-on time of the boost converter includes:
comparing a voltage supply for the ignition spark with the ascertained voltage requirement;
ascertaining whether an exceedance condition is met by checking whether the voltage supply exceeds the voltage requirement at least by a predetermined voltage difference; and
modifying the switch-on time to a later point in time relative to the switch-off time of the primary voltage generator when the exceedance condition is met, or modifying the switch-on time to an earlier point in time relative to the switch-off time of the primary voltage generator when the exceedance condition is not met.

9. The method of claim 1, wherein the voltage supply is ascertained by performing the following:
measuring an output voltage present across the spark gap or a corresponding voltage;
evaluating a gradient of the measured output voltage, in particular, at the point in time of ignition; and
deriving the voltage supply from the output voltage and/or from the gradient of the output voltage.

10. The method of claim 1, wherein the voltage supply is ascertained by performing the following:
determining influence variables of the ignition system, in particular, the temperature of a primary winding of the primary voltage generator and the primary current flowing through the primary winding; and
deriving the voltage supply from the influence variables.

11. The method of claim 1, wherein the modifying of the switch-on time occurs in predefinable stages.

12. The method of claim 1, wherein the switch-on time of the boost converter is determined by the point in time at which a switch of the boost converter is switched on and cyclically switched.

13. The method of claim 1, wherein the ascertaining of the voltage requirement includes performing at least one of: (i) measuring an output voltage present across the spark gap or a corresponding measured voltage, and (ii) receiving a signal from an electronic control unit, in particular, an engine control unit.

14. A computer readable medium having a computer program, which is executable by a processor, comprising:
a program code arrangement having program code for adjusting a high voltage supply for an ignition spark in an ignition system to be generated with a primary voltage generator, the ignition system including the primary voltage generator and a boost converter, for an internal combustion engine, by performing the following:
ascertaining a voltage requirement for an ignition sparkover to be generated; and
modifying, in response to the voltage requirement, a switch-on time of the boost converter relative to a switch-off time of the primary voltage generator;
wherein at least one of: (i) the modifying includes, in response to a reduced voltage requirement, modifying the switch-on time of the boost converter such that the boost converter is switched on at a later point in time relative to the switch-off time of the primary voltage generator, the boost converter being switched on before the primary voltage generator is switched off, and (ii) the modifying includes, in response to an increased voltage requirement, modifying the switch-on time of the boost converter such that the boost converter is switched on at an earlier point in time relative to the switch-off time of the primary voltage regulator, the boost converter being switched on before the primary voltage generator is switched off.

15. The computer readable memory medium of claim 14, wherein the ascertaining of the voltage requirement includes performing at least one of: (i) measuring an output voltage present across the spark gap or a corresponding measured voltage, and (ii) receiving a signal from an electronic control unit.

16. An ignition system, comprising:
a control arrangement configured for adjusting a high voltage supply for an ignition spark in an ignition system to be generated with a primary voltage generator, the ignition system including the primary voltage generator and a boost converter, for an internal combustion engine, by performing the following:
ascertaining a voltage requirement for an ignition sparkover to be generated; and
modifying, in response to the voltage requirement, a switch-on time of the boost converter relative to a switch-off time of the primary voltage generator;
wherein at least one of: (i) the modifying includes, in response to a reduced voltage requirement, modifying the switch-on time of the boost converter such that the boost converter is switched on at a later point in time relative to the switch-off time of the primary voltage generator, the boost converter being switched on before the primary voltage generator is switched off, and (ii) the modifying includes, in response to an increased voltage requirement, modifying the switch-on time of the boost converter such that the boost converter is switched on at an earlier point in time relative to the switch-off time of the primary voltage regulator, the boost converter being switched on before the primary voltage generator is switched off.

* * * * *